US011691504B2

United States Patent
Langenderfer

(10) Patent No.: US 11,691,504 B2
(45) Date of Patent: Jul. 4, 2023

(54) PRIME MOVER SYSTEMS WITH A POWER TAKE-OFF SYSTEM AND A TRANSMISSION

(71) Applicant: CUMMINS INC., Columbus, IN (US)

(72) Inventor: David J. Langenderfer, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/281,498

(22) PCT Filed: Feb. 5, 2020

(86) PCT No.: PCT/US2020/016736
§ 371 (c)(1),
(2) Date: Mar. 30, 2021

(87) PCT Pub. No.: WO2020/167544
PCT Pub. Date: Aug. 20, 2020

(65) Prior Publication Data
US 2021/0394612 A1   Dec. 23, 2021

Related U.S. Application Data

(60) Provisional application No. 62/804,819, filed on Feb. 13, 2019.

(51) Int. Cl.
*B60K 17/28* (2006.01)
*B60K 25/06* (2006.01)
(Continued)

(52) U.S. Cl.
CPC ............... *B60K 17/28* (2013.01); *B60K 1/02* (2013.01); *B60K 17/08* (2013.01); *B60K 25/06* (2013.01);
(Continued)

(58) Field of Classification Search
CPC .......... B60K 17/28; B60K 17/08; B60K 1/02; B60K 1/04; B60K 25/06; B60L 15/20; B60L 2240/421
See application file for complete search history.

(56) References Cited

U.S. PATENT DOCUMENTS

| 5,669,842 A | 9/1997 | Schmidt |
| 7,391,129 B2 | 6/2008 | Chiao et al. |
(Continued)

FOREIGN PATENT DOCUMENTS

| GB | 2475227 A | * | 5/2011 | .......... A01M 7/0042 |
| WO | WO-2008/122862 A1 | | 10/2008 |
(Continued)

OTHER PUBLICATIONS

Bosch Modility Solutions, "EN | Bosch Automated Manual Transmission System for commercial vehicles," accessed via https://www.youtube.com/watch?v=br1fGT2iCTU, 6 pages, Sep. 11, 2015.
(Continued)

*Primary Examiner* — Tisha D Lewis
(74) *Attorney, Agent, or Firm* — Foley & Lardner LLP

(57) ABSTRACT

A prime mover system includes a first prime mover, a first drive shaft, a differential, a power take-off (PTO) drive shaft, a second drive shaft, a transmission, a first accessory, and an output shaft. The first drive shaft is operatively coupled to the first prime mover. The differential is coupled to the first drive shaft. The PTO drive shaft is coupled to the differential. The second drive shaft is coupled to the differential. The transmission is coupled to the second drive shaft. The first accessory is operatively coupled to the PTO drive shaft. The output shaft is coupled to the transmission. The transmission is configured to transfer rotation of the second drive shaft to the output shaft. Rotation of the PTO drive shaft is independent of rotation of the output shaft.

17 Claims, 1 Drawing Sheet

(51) Int. Cl.
  *B60L 15/20*   (2006.01)
  *B60K 1/02*   (2006.01)
  *B60K 17/08*   (2006.01)
  *B60K 1/04*   (2019.01)

(52) U.S. Cl.
  CPC ................ *B60L 15/20* (2013.01); *B60K 1/04* (2013.01); *B60L 2240/421* (2013.01)

(56) References Cited

U.S. PATENT DOCUMENTS

| | | | |
|---|---|---|---|
| 7,411,312 | B2 | 8/2008 | Chiao |
| 7,492,055 | B2 | 2/2009 | Chiao |
| 7,690,451 | B2 | 4/2010 | Chiao |
| 8,567,538 | B2 * | 10/2013 | Hancock, Sr. ......... B60K 25/00 180/53.6 |
| 8,939,240 | B2 | 1/2015 | Wehrwein et al. |
| 2009/0069154 | A1 * | 3/2009 | Wegeng ................ B60K 25/06 477/111 |
| 2012/0071311 | A1 * | 3/2012 | Ricci ..................... B65H 29/56 493/454 |
| 2015/0135863 | A1 * | 5/2015 | Dalum .................... B60K 6/00 180/65.21 |
| 2018/0154773 | A1 | 6/2018 | Dalum |
| 2018/0222484 | A1 | 8/2018 | Shively et al. |

FOREIGN PATENT DOCUMENTS

| | | | |
|---|---|---|---|
| WO | WO-2010065476 A2 * | 6/2010 | .............. B60K 6/12 |
| WO | WO-2015/074074 A1 | 5/2015 | |
| WO | WO-2017/123495 A2 | 7/2017 | |

OTHER PUBLICATIONS

International Search Report and Written Opinion for PCT/US2020/016736, dated Jun. 19, 2020.

* cited by examiner

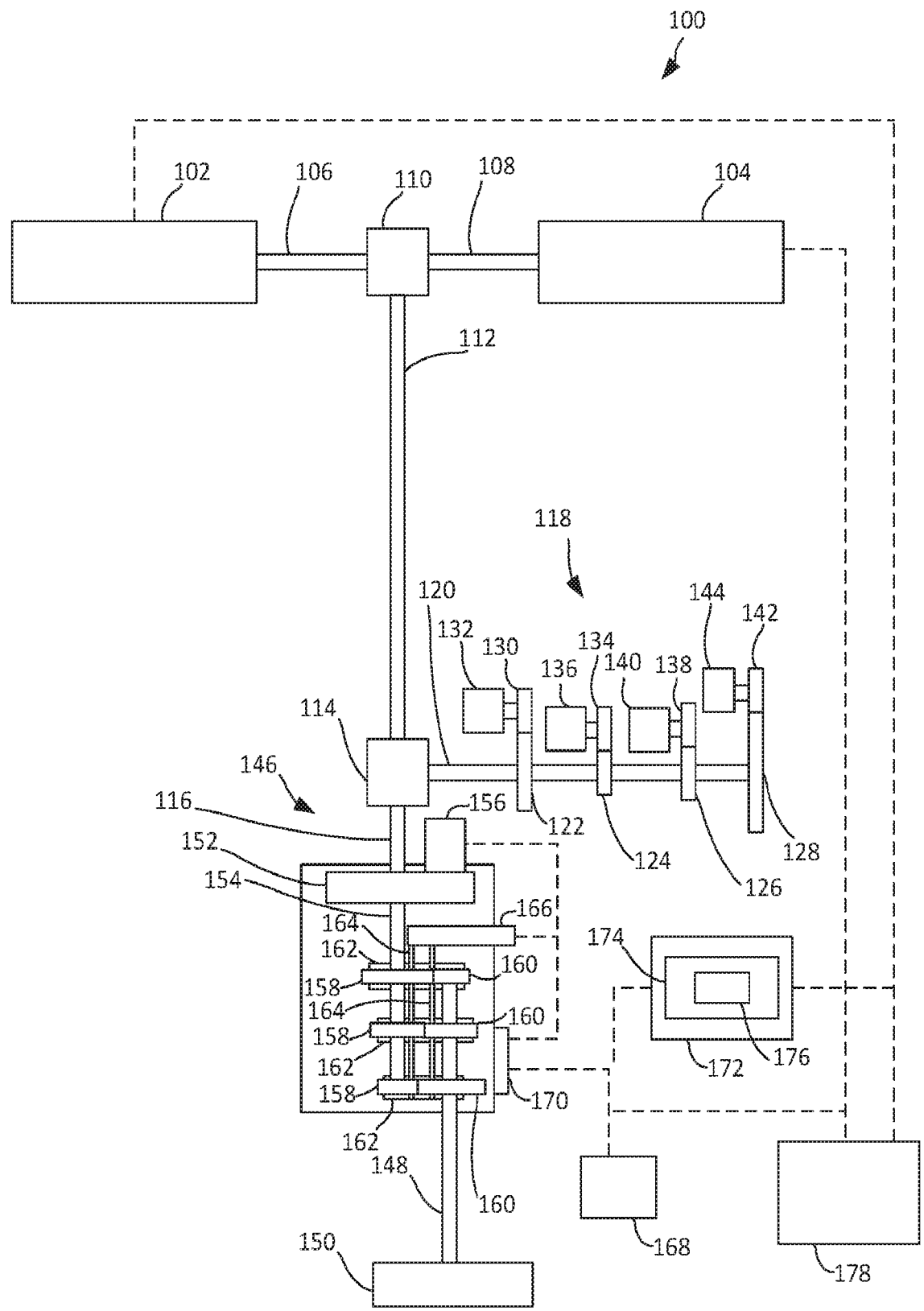

PRIME MOVER SYSTEMS WITH A POWER TAKE-OFF SYSTEM AND A TRANSMISSION

CROSS-REFERENCE TO RELATED PATENT APPLICATIONS

The present application is the U.S. national phase of PCT Application No. PCT/US2020/016736 filed Feb. 5, 2020, which claims priority to and the benefit of U.S. Provisional Patent Application No. 62/804,819, entitled "Prime Mover Systems with a Power Take-Off System and a Transmission," filed Feb. 13, 2019, the contents of which are incorporated herein by reference.

TECHNICAL FIELD

The present application relates generally to prime mover systems with a power take-off system and a transmission.

BACKGROUND

A motor may be used to drive an output shaft. The output shaft may be used to drive wheels on a vehicle. The vehicle may have several accessories that require power from a motor in order to operate. Typically, these accessories are driven by individual motors that are separate from the motor that is used to drive the output shaft. As a result, the vehicle has a plurality of motors. The number of motors that the vehicle has may directly affect a cost of the vehicle, and the number of motors may be inversely related to a service life of the vehicle and the service lives of the accessories. Accordingly, as the number of motors that a vehicle has increases, the cost of the vehicle also increases and the service life of the vehicle and the service lives of the accessories decreases.

SUMMARY

In one embodiment, a prime mover system includes a first prime mover, a first drive shaft, a differential, a power take-off (PTO) drive shaft, a second drive shaft, a transmission, a first accessory, and an output shaft. The first drive shaft is operatively coupled to the first prime mover. The differential is coupled to the first drive shaft. The PTO drive shaft is coupled to the differential. The second drive shaft is coupled to the differential. The transmission is coupled to the second drive shaft. The first accessory is operatively coupled to the PTO drive shaft. The output shaft is coupled to the transmission. The transmission is configured to transfer rotation of the second drive shaft to the output shaft. Rotation of the PTO drive shaft is independent of rotation of the output shaft.

In another embodiment, a prime mover system that is configured to drive a first accessory and a second accessory includes a first prime mover, a first drive shaft, a power take-off (PTO) drive shaft, a transmission, a first power take-off transmission member, and an output shaft. The first drive shaft is operatively coupled to the first prime mover. The PTO drive shaft is operatively coupled to the first drive shaft. The transmission is operatively coupled to the first drive shaft. The first PTO transmission member is coupled to the PTO drive shaft and is configured to drive the first accessory. The output shaft is coupled to the transmission. The transmission is configured to selectively transfer rotation of the first drive shaft to the output shaft. Rotation of the PTO drive shaft is independent of rotation of the output shaft.

In yet another embodiment, a prime mover system configured to drive a first accessory and a second accessory includes a first prime mover, a second prime mover, a first prime mover drive shaft, a second prime mover drive shaft, a first drive shaft, a first differential, a power take-off (PTO) drive shaft, a second differential, and a first PTO transmission member. The first prime mover drive shaft is operatively coupled to the first prime mover. The second prime mover drive shaft is operatively coupled to the second prime mover. The first differential is coupled to the first drive shaft, the first prime mover drive shaft, and the second prime mover drive shaft. The first differential is configured to transfer to the first drive shaft rotation of at least one of: (i) the first prime mover drive shaft or (ii) the second prime mover drive shaft. The second differential is coupled to the first drive shaft and the PTO drive shaft. The second differential is configured to transfer rotation of the first drive shaft to the PTO drive shaft. The first PTO transmission member is coupled to the PTO drive shaft and configured to drive the first accessory.

BRIEF DESCRIPTION OF THE DRAWING

The details of one or more implementations are set forth in the accompanying drawing and the description below. Other features, aspects, and advantages of the disclosure will become apparent from the description, the drawing, and the claims, in which:

FIG. 1 is a block diagram of an example prime mover system.

It will be recognized that the drawing is a schematic representations for purposes of illustration. The drawing is provided for the purpose of illustrating one or more implementations with the explicit understanding that it will not be used to limit the scope or the meaning of the claims.

DETAILED DESCRIPTION

Following below are more detailed descriptions of various concepts related to, and implementations of, methods, apparatuses, and systems with a prime mover system having a power take-off system and a transmission. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Implementations herein are related to a prime mover system that includes two prime movers and is configured to provide a traction force and drive one or more accessories using the same two prime movers. The traction force is provided by a transmission which is driven by the two prime movers. The accessories are driven using a power take-off system. The power take-off system includes a drive shaft that is rotated by the prime movers independent of the transmission. In this way, the accessories may be driven by the same prime movers that are capable of providing the traction force for the prime mover system.

In contrast to the prime mover system described herein, various conventional systems use individual motors which drive accessories independent of motors that provide traction force. This arrangement requires multiple motors. The number of motors that a vehicle has may directly affect a cost of the vehicle and may be inversely related to a service life of the vehicle and the service lives of accessories associated with their own motor. Accordingly, as the number of motors that a vehicle has increases, the cost of the vehicle also increases and the service life of the vehicle and the service lives of the accessories decreases. By using the same prime movers to provide the traction force and drive accessories, the prime mover system described herein may be less expensive and have a greater service life than systems which require multiple motors.

Additionally, the power take-off system described herein is capable of providing a target ratio for driving the accessories so that the accessories are driven in an optimal fashion. The target ratio may be provided by selecting from various commercially available off-the-shelf components that can facilitate coupling between the power take-off system and the accessories. In this way, the prime mover system described herein can be easily and inexpensively customized to drive various accessories in an optimal fashion.

II. Example Prime Mover System

FIG. 1 depicts a prime mover system 100. The prime mover system 100 may be utilized in an electric vehicle (EV) or a hybrid vehicle (e.g., a vehicle that is driven using a fuel cell and gasoline or diesel fuel, a vehicle that is driven using electricity and gasoline, a vehicle that is driven using electricity and diesel fuel, a vehicle that is driven using electricity and propane, etc.). The prime mover system 100 includes a first prime mover 102 (e.g., motor, traction motor, electric motor, etc.) and a second prime mover 104 (e.g., motor, traction motor, electric motor, etc.). The first prime mover 102 and the second prime mover 104 consume electricity (e.g., electrical energy, etc.). In various example embodiments, the first prime mover 102 and the second prime mover 104 are traction motors (e.g., traction motors with a peak output of 350 kilowatts, traction motors with 225 kilowatt continuous ratings, etc.). In some embodiments, the first prime mover 102 and the second prime mover 104 are identical.

The first prime mover 102 includes a first prime mover drive shaft 106, and the second prime mover 104 includes a second prime mover drive shaft 108. The first prime mover 102 is configured to rotate (e.g., is structure to rotate, is capable of rotating, etc.) the first prime mover drive shaft 106, and the second prime mover 104 is configured to rotate the second prime mover drive shaft 108. The prime mover system 100 also includes a first differential 110 (e.g., gearbox, etc.). The first differential 110 couples the first prime mover drive shaft 106 and the second prime mover drive shaft 108 to a first drive shaft 112. In this way, the first drive shaft 112 is operatively coupled to the first prime mover 102 and the second prime mover 104.

Through the first differential 110, rotation of the first prime mover drive shaft 106 and/or rotation of the second prime mover drive shaft 108 causes rotation of the first drive shaft 112. In various applications, the first prime mover 102 and the second prime mover 104 cooperate to rotate the first drive shaft 112. In other applications, one of the first prime mover 102 and the second prime mover 104 does not operate, and the other of the first prime mover 102 and the second prime mover 104 rotates the first drive shaft 112. In no applications (in accordance with various embodiments), however, do the first prime mover 102 and the second prime mover 104 perform any function other than rotating the first drive shaft 112 or not rotating the first drive shaft 112.

The prime mover system 100 also includes a second differential 114 (e.g., gearbox, etc.). The second differential 114 couples the first drive shaft 112 to a second drive shaft 116. Through the second differential 114, rotation of the first drive shaft 112 causes rotation of the second drive shaft 116. In this way, the second drive shaft 116 is operatively coupled to the first drive shaft 112.

The prime mover system 100 also includes a power take-off (PTO) system 118. The PTO system 118 includes a PTO drive shaft 120. The second differential 114 also couples the PTO drive shaft 120 to the first drive shaft 112. Through the second differential 114, rotation of the first drive shaft 112 causes rotation of the PTO drive shaft 120 and the second drive shaft 116. In this way, the PTO drive shaft 120 is operatively coupled to the first drive shaft 112 and is driven by the first prime mover 102 and/or the second prime mover 104 directly (e.g., without an intervening transmission, without a clutch, without planetary gears, without controls, etc.).

The PTO system 118 also includes a first PTO transmission member 122 (e.g., gear, sprocket, pulley, etc.), a second PTO transmission member 124 (e.g., gear, sprocket, pulley, etc.), a third PTO transmission member 126 (e.g., gear, sprocket, pulley, etc.), and a fourth PTO transmission member 128 (e.g., gear, sprocket, pulley, etc.).

The first PTO transmission member 122 is coupled to (e.g., via a mating interface, via a chain, via a belt, etc.) a first PTO accessory transmission member 130 (e.g., gear, sprocket, pulley, etc.). The first PTO accessory transmission member 130 is coupled to a first PTO accessory 132 (e.g., air compressor, air conditioning compressor, power steering pump, etc.). In this way, the first PTO transmission member 122 and the first PTO accessory transmission member 130 operatively couple the first PTO accessory 132 to the PTO drive shaft 120.

The second PTO transmission member 124 is coupled to (e.g., via a mating interface, via a chain, via a belt, etc.) a second PTO accessory transmission member 134 (e.g., gear, sprocket, pulley, etc.). The second PTO accessory transmission member 134 is coupled to a second PTO accessory 136 (e.g., air compressor, air conditioning compressor, power steering pump, etc.). In this way, the second PTO transmission member 124 and the second PTO accessory transmission member 134 operatively couple the second PTO accessory 136 to the PTO drive shaft 120.

The third PTO transmission member 126 is coupled to (e.g., via a mating interface, via a chain, via a belt, etc.) a third PTO accessory transmission member 138 (e.g., gear, sprocket, pulley, etc.). The third PTO accessory transmission member 138 is coupled to a third PTO accessory 140 (e.g., air compressor, air conditioning compressor, power steering pump, etc.). In this way, the third PTO transmission member 126 and the third PTO accessory transmission member 138 operatively couple the third PTO accessory 140 to the PTO drive shaft 120.

The fourth PTO transmission member 128 is coupled to (e.g., via a mating interface, via a chain, via a belt, etc.) a fourth PTO accessory transmission member 142 (e.g., gear, sprocket, pulley, etc.). The fourth PTO accessory transmission member 142 is coupled to a fourth PTO accessory 144 (e.g., air compressor, air conditioning compressor, power steering pump, etc.). In this way, the fourth PTO transmission member 128 and the fourth PTO accessory transmission member 142 operatively couple the fourth PTO accessory 144 to the PTO drive shaft 120.

In some embodiments, the first PTO accessory 132 is different from any of the second PTO accessory 136, the third PTO accessory 140, and the fourth PTO accessory 144, the second PTO accessory 136 is different from any of the first PTO accessory 132, the third PTO accessory 140, and the fourth PTO accessory 144, the third PTO accessory 140 is different from any of the first PTO accessory 132, the second PTO accessory 136, and the fourth PTO accessory 144, and the fourth PTO accessory 144 is different from any of the first PTO accessory 132, the second PTO accessory 136, and the third PTO accessory 140. For example, the first PTO accessory 132 may be an air compressor, the second PTO accessory 136 may be an air conditioning compressor, the third PTO accessory 140 may be a power steering pump, and the fourth PTO accessory 144 may be a brake pump.

The first PTO accessory 132 is defined by a first target input (e.g., torque, rotational speed, etc.). In order to provide the first target input, the first PTO transmission member 122 and the first PTO accessory transmission member 130 are selected to provide a target ratio (e.g., a first gear ratio, etc.). In order to change the target ratio, the first PTO transmission member 122 may be interchanged with a different first PTO transmission member 122 and/or the first PTO accessory transmission member 130 may be interchanged with a different first PTO accessory transmission member 130.

The second PTO accessory 136 is defined by a second target input (e.g., torque, rotational speed, etc.). In order to provide the second target input, the second PTO transmission member 124 and the second PTO accessory transmission member 134 are selected to provide a target ratio (e.g., a second gear ratio, etc.). In order to change the target ratio, the second PTO transmission member 124 may be interchanged with a different second PTO transmission member 124 and/or the second PTO accessory transmission member 134 may be interchanged with a different second PTO accessory transmission member 134.

The third PTO accessory 140 is defined by a third target input (e.g., torque, rotational speed, etc.). In order to provide the third target input, the third PTO transmission member 126 and the third PTO accessory transmission member 138 are selected to provide a target ratio (e.g., a third gear ratio, etc.). In order to change the target ratio, the third PTO transmission member 126 may be interchanged with a different third PTO transmission member 126 and/or the third PTO accessory transmission member 138 may be interchanged with a different third PTO accessory transmission member 138.

The fourth PTO accessory 144 is defined by a fourth target input (e.g., torque, rotational speed, etc.). In order to provide the fourth target input, the fourth PTO transmission member 128 and the fourth PTO accessory transmission member 142 are selected to provide a target ratio (e.g., a fourth gear ratio, etc.). In order to change the target ratio, the fourth PTO transmission member 128 may be interchanged with a different fourth PTO transmission member 128 and/or the fourth PTO accessory transmission member 142 may be interchanged with a different fourth PTO accessory transmission member 142.

The first PTO transmission member 122, the second PTO transmission member 124, the third PTO transmission member 126, the fourth PTO transmission member 128, the first PTO accessory transmission member 130, the second PTO accessory transmission member 134, the third PTO accessory transmission member 138, and the fourth PTO accessory transmission member 142 may be commercially available off-the-shelf components. In this way, the prime mover system 100 can be easily and inexpensively customized to drive various accessories in an optimal fashion.

By being able to select the ratio for each of the first PTO accessory 132, the second PTO accessory 136, the third PTO accessory 140, and the fourth PTO accessory 144, each of the first PTO accessory 132, the second PTO accessory 136, the third PTO accessory 140, and the fourth PTO accessory 144 may operate in its respective optimal range (e.g., a range of inputs where output is more desirable, etc.). This increases the efficiency of the first PTO accessory 132, the second PTO accessory 136, the third PTO accessory 140, and the fourth PTO accessory 144, thereby making the prime mover system 100 more desirable than similar systems which do not enable operation of accessories in their optimal range. In some embodiments, the ratio for the first PTO accessory 132 is different from the ratio of the second PTO accessory 136, the ratio of the third PTO accessory 140, and the ratio of the fourth PTO accessory 144, the ratio for the second PTO accessory 136 is different from the ratio for the first PTO accessory 132, the ratio for the third PTO accessory 140, and the ratio for the fourth PTO accessory 144, the ratio for the third PTO accessory 140 is different from the ratio for the first PTO accessory 132, the ratio for the second PTO accessory 136, and the ratio for the fourth PTO accessory 144, and the ratio for the fourth PTO accessory 144 is different from the ratio for the first PTO accessory 132, the ratio for the second PTO accessory 136, and the ratio for the third PTO accessory 140.

While the PTO system 118 is shown as including the first PTO accessory 132 (and therefore the first PTO transmission member 122 and the first PTO accessory transmission member 130), the second PTO accessory 136 (and therefore the second PTO transmission member 124 and the second PTO accessory transmission member 134), the third PTO accessory 140 (and therefore the third PTO transmission member 126 and the third PTO accessory transmission member 138), and the fourth PTO accessory 144 (and therefore the fourth PTO transmission member 128 and the fourth PTO accessory transmission member 142), it is understood that the PTO system 118 may include additional PTO accessories similar to the first PTO accessory 132, the second PTO accessory 136, the third PTO accessory 140, and the fourth PTO accessory 144 (and therefore additional PTO transmission members similar to the first PTO transmission member 122, the second PTO transmission member 124, the third PTO transmission member 126, and the fourth PTO transmission member 128 and additional PTO accessory transmission members similar to the first PTO accessory transmission member 130, the second PTO accessory transmission member 134, the third PTO accessory transmission member 138, and the fourth PTO accessory transmission member 142). It is also understood that the PTO system 118 does not include some of the first PTO accessory 132, the second PTO accessory 136, the third PTO accessory 140, and the fourth PTO accessory 144 (and therefore does not include some of the PTO transmission member 122, the second PTO transmission member 124, the third PTO transmission member 126, the fourth PTO transmission member 128, the first PTO accessory transmission member 130, the second PTO accessory transmission member 134, the third PTO accessory transmission member 138, and the fourth PTO accessory transmission member 142) in some embodiments.

The prime mover system 100 also includes a transmission 146. In various embodiments, the transmission 146 is an automated manual transmission. In other embodiments, the transmission 146 is an automatic transmission. The transmission 146 selectively transfers rotation of the second drive shaft 116 to an output shaft 148 which is coupled to an output member 150 (e.g., wheel, track, etc.). The output member 150 may provide traction force.

The prime mover system 100 is configured such that rotation of the PTO drive shaft 120 is independent of rotation of the output shaft 148. In this way, the first PTO accessory 132, the second PTO accessory 136, the third PTO accessory 140, and the fourth PTO accessory 144 may be driven by the first prime mover 102 and/or the second prime mover 104 when the output shaft 148 is not being rotated. Additionally, the first PTO accessory 132, the second PTO accessory 136, the third PTO accessory 140, and the fourth PTO accessory 144 may be driven without separate motors, thereby enabling the prime mover system 100 to be significantly less expensive than similar systems where accessories are driven by separate motors. Additionally, the prime mover system 100 may avoid service and repairs associated with the use of separate motors.

In embodiments where the transmission 146 is an automated manual transmission, the transmission 146 includes a clutch 152 (e.g., dual clutch, hydraulic clutch, mechanical clutch, etc.). The clutch 152 is selectively repositionable between a first position (e.g., engaged position, etc.), where rotation of the second drive shaft 116 is transferred to a fifth drive shaft 154, and a second position (e.g., disengaged position, etc.). The transmission 146 includes a clutch actuator 156 (e.g., concentric clutch actuator, axial clutch actuator, etc.) that is coupled to the clutch 152 and configured to selectively reposition the clutch 152 between the first position and the second position. For example, the clutch actuator 156 may be a hydraulic or pneumatic actuator. The transmission 146 also includes a plurality of input gears 158 coupled to the fifth drive shaft 154 and a plurality of output gears 160 coupled to the output shaft 148. When one of the output gears 160 is coupled to one of the input gears 158 and the clutch 152 is in the first position, rotation of the fifth drive shaft 154 is transferred to the output shaft 148. The transmission 146 also includes a plurality of shift forks 162. Each of the shift forks 162 is coupled to at least one of the input gears 158. The transmission 146 also includes a plurality of shift shafts 164. Each of the shift shafts 164 is coupled to at least one of the shift forks 162. The transmission 146 also includes a gear shifter 166 (e.g., linear actuator, motor-driven gear shifter, hydraulic gear shifter, etc.). The gear shifter 166 is coupled to the shift shafts 164 and is configured to couple one of the input gears 158 to one of the output gears 160 by repositioning one of the shift shafts 164, thereby causing repositioning of one of the shift forks 162 and of the one of the input gears 158.

The prime mover system 100 also includes a cab shifter 168, and the transmission 146 also includes a transmission control unit 170. The cab shifter 168 may be positioned within a cab of a vehicle and may be interacted with by a user. The cab shifter 168 is coupled to the transmission control unit 170. In some applications, the transmission control unit 170 automatically causes the transmission 146 to shift gears (e.g., based upon speed of the vehicle, based upon speed of the output shaft 148, etc.). In other applications, the transmission control unit 170 causes the transmission 146 to shift gears in response to receiving an input from the cab shifter 168.

In embodiments where the transmission 146 is an automated manual transmission, the transmission control unit 170 is coupled to the gear shifter 166 and the clutch actuator 156. The transmission control unit 170 causes the transmission 146 to shift gears by interacting with the gear shifter 166 and the clutch actuator 156. For example, when shifting between gears, the transmission control unit 170 may cause the clutch actuator 156 to disengage the clutch 152 (e.g., reposition the clutch 152 from the engaged position to the disengaged position), cause the gear shifter 166 to reposition at least one of the shift shafts 164, thereby repositioning at least one of the shift forks 162 and at least one of the input gears 158, and then cause the clutch actuator 156 to engage the clutch 152 (e.g., reposition the clutch 152 from the disengaged position to the engaged position).

The prime mover system 100 also includes a controller 172 (e.g., prime mover control unit, etc.) The controller 172 is communicable with the first prime mover 102 and the second prime mover 104. The controller 172 may be configured to cause the first prime mover 102 and the second prime mover 104 to rotate the first drive shaft 112 at a target speed so as to provide a target output to one of the first PTO accessory 132, the second PTO accessory 136, the third PTO accessory 140, and the fourth PTO accessory 144. The controller 172 is also communicable with the transmission control unit 170 and the gear shifter 166 when the transmission 146 is an automated manual transmission.

The controller 172 includes a processor 174. The processor 174 may include a microprocessor, an application-specific integrated circuit (ASIC), a field-programmable gate array (FPGA), etc., or combinations thereof. The processor 174 also includes a memory 176. The memory 176 may include, but is not limited to, electronic, optical, magnetic, or any other storage or transmission device capable of providing a processor, ASIC, FPGA, etc. with program instructions. The memory 176 may include a memory chip, Electrically Erasable Programmable Read-Only Memory (EEPROM), Erasable Programmable Read Only Memory (EPROM), flash memory, or any other suitable memory from which the processor 174 can read instructions. The instructions may include code from any suitable programming language.

While not shown, it is understood that the transmission control unit 170, the clutch actuator 156, and the gear shifter 166 may include a processor similar to the processor 174 and a memory similar to the memory 176.

The prime mover system 100 also includes a battery 178 (e.g., lithium ion battery, rechargeable battery, battery cell, etc.). The battery 178 is coupled to the transmission control unit 170, the controller 172, the first prime mover 102, and the second prime mover 104. The battery 178 is configured to provide electrical power to, for example, the first prime mover 102 and the second prime mover 104. The battery 178 may also be configured to provide electrical power to the clutch actuator 156 and the gear shifter 166 in embodiments where the transmission 146 is an automated manual transmission.

In embodiments where the transmission 146 is not an automated manual transmission, the transmission 146 does not include the clutch 152 or the clutch actuator 156. In these embodiments, the transmission 146 may still include the input gears 158, the output gears 160, the shift forks 162, the shift shafts 164, the gear shifter 166, the cab shifter 168, the transmission control unit 170, the controller 172, and the battery 178. However, operation of the transmission 146 occurs differently because the clutch 152 is not included. Specifically, the second drive shaft 116 extends to the input gears 158 and replaces the fifth drive shaft 154, such that the fifth drive shaft 154 is not included.

In some embodiments, the prime mover system 100 includes only the first prime mover 102 and does not include the second prime mover 104. In these embodiments, the prime mover system 100 does not include the first differential 110 or the second prime mover drive shaft 108.

III. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

The terms "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being coupled to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A prime mover system comprising:
   a first prime mover;
   a first prime mover drive shaft coupled to the first prime mover;
   a second prime mover;
   a second prime mover drive shaft coupled to the second prime mover;
   a first differential coupled to the first prime mover drive shaft and the second prime mover drive shaft between the first prime mover drive shaft and the second prime mover drive shaft;
   a first drive shaft coupled to the first differential;
   a second differential coupled to the first drive shaft;
   a power take-off (PTO) drive shaft coupled to the second differential;
   a second drive shaft coupled to the second differential;
   a transmission coupled to the second drive shaft;
   a first accessory operatively coupled to the PTO drive shaft; and
   an output shaft coupled to the transmission;
   wherein the transmission is configured to transfer rotation of the second drive shaft to the output shaft; and
   wherein rotation of the PTO drive shaft is independent of rotation of the output shaft.

2. The prime mover system of claim 1, further comprising an output member coupled to the output shaft;
   wherein rotation of the output shaft causes the output member to produce force.

3. The prime mover system of claim 1, further comprising a second accessory coupled to the PTO drive shaft;
   wherein the first accessory is different from the second accessory.

4. The prime mover system of claim 1, further comprising:
   a first PTO transmission member coupled to the PTO drive shaft; and
   a first accessory transmission member coupled to the first PTO transmission member;
   wherein the first accessory is operatively coupled to the PTO drive shaft through the first PTO transmission member and the first accessory transmission member.

5. The prime mover system of claim 1, wherein the transmission is an automated manual transmission.

6. The prime mover system of claim 1, wherein the transmission is an automatic transmission.

7. A prime mover system configured to drive a first accessory and a second accessory, the prime mover system comprising:
   a first prime mover;
   a second prime mover;
   a first drive shaft operatively coupled to the first prime mover and the second prime mover;
   a power take-off (PTO) drive shaft operatively coupled to the first drive shaft;
   a transmission operatively coupled to the first drive shaft;
   a first PTO transmission member coupled to the PTO drive shaft and configured to drive the first accessory;
   an output shaft coupled to the transmission; and
   a second PTO transmission member coupled to the PTO drive shaft and configured to drive the second accessory;
   wherein the transmission is configured to selectively transfer rotation of the first drive shaft to the output shaft; and
   wherein rotation of the PTO drive shaft is independent of rotation of the output shaft.

8. The prime mover system of claim 7, further comprising:
   a first prime mover drive shaft coupled to the first prime mover;
   a second prime mover drive shaft coupled to the second prime mover; and
   a differential coupled to the first prime mover drive shaft, the second prime mover drive shaft, and the first drive shaft, the differential configured to transfer to the first drive shaft at least one of: (i) rotation of the first prime mover drive shaft or (ii) rotation of the second prime mover drive shaft.

9. The prime mover system of claim 7, further comprising:

a first accessory transmission member coupled to the first PTO transmission member and coupling the first PTO transmission member to the first accessory; and
a second accessory transmission member coupled to the second PTO transmission member and coupling the second PTO transmission member to the second accessory;
wherein the first PTO transmission member and the first accessory transmission member are defined by a first ratio; and
wherein the second PTO transmission member and the second accessory transmission member are defined by a second ratio different from the first ratio.

10. The prime mover system of claim 7, wherein rotation of the PTO drive shaft causes simultaneous rotation of the first PTO transmission member and the second PTO transmission member.

11. The prime mover system of claim 7, further comprising:
an output member coupled to the output shaft and configured to be rotated by the output shaft; and
a battery coupled to the first prime mover, the battery configured to provide power to the first prime mover.

12. The prime mover system of claim 7, further comprising a controller communicable with the first prime mover and configured to rotate the first drive shaft at a target speed so as to provide a target output to one of the first PTO transmission member.

13. The prime mover system of claim 12, wherein
the transmission is communicable with the controller;
the transmission comprises:
a clutch actuator communicable with the controller; and
a gear shifter communicable with the controller; and
the controller is configured to communicate with at least one of the clutch actuator or the gear shifter, to change a gear ratio of the transmission.

14. The prime mover system of claim 7, further comprising a differential coupled to the first drive shaft and the PTO drive shaft, the differential configured to transfer rotation of the first drive shaft to the PTO drive shaft;
wherein the first drive shaft, the PTO drive shaft, the differential, and the first PTO transmission member are configured such that rotation of the first drive shaft causes rotation of the first PTO transmission member.

15. A prime mover system configured to drive a first accessory and a second accessory, the prime mover system comprising:
a first prime mover;
a second prime mover;
a first prime mover drive shaft operatively coupled to the first prime mover;
a second prime mover drive shaft operatively coupled to the second prime mover;
a first drive shaft;
a first differential coupled to the first drive shaft, the first prime mover drive shaft, and the second prime mover drive shaft, the first differential configured to transfer to the first drive shaft rotation of at least one of: (i) the first prime mover drive shaft or (ii) the second prime mover drive shaft;
a power take-off (PTO) drive shaft;
a second differential coupled to the first drive shaft and the PTO drive shaft, the second differential configured to transfer rotation of the first drive shaft to the PTO drive shaft;
a first PTO transmission member coupled to the PTO drive shaft and configured to drive the first accessory; and
a second PTO transmission member coupled to the PTO drive shaft and configured to drive the second accessory;
wherein the PTO drive shaft, the first PTO transmission member, and the second PTO transmission member are configured such that rotation of the PTO drive shaft causes simultaneous rotation of the first PTO transmission member and the second PTO transmission member.

16. The prime mover system of claim 15, further comprising:
a second drive shaft coupled to the second differential; and
an output member operatively coupled to the second drive shaft;
wherein the second differential is configured to transfer rotation of the first drive shaft to the second drive shaft and the PTO drive shaft simultaneously.

17. A prime mover system configured to drive a first accessory and a second accessory, the prime mover system comprising:
a first prime mover;
a first drive shaft operatively coupled to the first prime mover;
a power take-off (PTO) drive shaft operatively coupled to the first drive shaft;
a transmission operatively coupled to the first drive shaft;
a first PTO transmission member coupled to the PTO drive shaft and configured to drive the first accessory;
an output shaft coupled to the transmission;
a first accessory transmission member coupled to the first PTO transmission member and coupling the first PTO transmission member to the first accessory;
a second PTO transmission member coupled to the PTO drive shaft and configured to drive the second accessory; and
a second accessory transmission member coupled to the second PTO transmission member and coupling the second PTO transmission member to the second accessory;
wherein the transmission is configured to selectively transfer rotation of the first drive shaft to the output shaft;
wherein rotation of the PTO drive shaft is independent of rotation of the output shaft;
wherein the first PTO transmission member and the first accessory transmission member are defined by a first ratio; and
wherein the second PTO transmission member and the second accessory transmission member are defined by a second ratio different from the first ratio.

* * * * *